United States Patent [19]

O'Neall et al.

[11] Patent Number: 4,883,128
[45] Date of Patent: Nov. 28, 1989

[54] GUIDANCE SYSTEM FOR FARM IMPLEMENTS

[75] Inventors: Donald L. O'Neall, Rte. 1, Box 165, Downs, Ill. 61736; Kerry L. Meyer, Bloomington, Ill.

[73] Assignee: Donald L. O'Neall, Downs, Ill.

[21] Appl. No.: 271,375

[22] Filed: Nov. 14, 1988

Related U.S. Application Data

[63] Continuation of Ser. No. 892,124, Jul. 30, 1986, abandoned.

[51] Int. Cl.[4] .............................................. A01B 69/00
[52] U.S. Cl. ...................................... 172/430; 172/26; 116/289; 116/296
[58] Field of Search ................... 172/2, 5, 6, 26, 430; 250/211 K, 214 A; 56/10.2, DIG. 15; 180/131; 116/284, 289, 291, 296

[56] References Cited

U.S. PATENT DOCUMENTS

| | | | |
|---|---|---|---|
| 2,929,457 | 3/1960 | Langerak | 172/430 |
| 3,039,087 | 6/1962 | Huston | 172/430 X |
| 3,129,416 | 4/1964 | Freedman | 250/211 K X |
| 3,392,697 | 7/1968 | Parrish et al. | 172/430 X |
| 3,424,908 | 1/1969 | Sitter | 250/214 A |
| 3,611,286 | 10/1971 | Cleveland | 172/430 |
| 3,892,961 | 7/1975 | Bachmann | 250/211 K |
| 3,991,618 | 11/1976 | Stampfer et al. | 56/DIG. 15 X |
| 4,103,155 | 7/1978 | Clark | 250/211 K X |
| 4,126,984 | 11/1978 | Gail | 56/10.2 |
| 4,166,349 | 9/1979 | Coenenberg et al. | 56/10.2 |
| 4,184,072 | 1/1980 | Sandford et al. | 250/211 K X |
| 4,250,380 | 2/1981 | Iyeta | 250/211 K X |
| 4,295,323 | 10/1981 | Maier et al. | 56/10.2 |
| 4,298,084 | 11/1981 | Newell | 172/26 X |
| 4,304,316 | 12/1981 | Lang | 180/131 |
| 4,454,919 | 6/1984 | Arnold et al. | 172/430 X |
| 4,734,683 | 3/1988 | Howell, Jr. et al. | 172/26 X |

FOREIGN PATENT DOCUMENTS 1483581 8/1977 United Kingdom ................ 172/430

OTHER PUBLICATIONS

Orthman, "Tracker MPIII", Sales Brochure, Orthman Mftg. Inc., Lexington, NE.
The Guide Owner's Guide and Parts List—Lincoln Creek Manufacturing Phillips, NE 68865.
Brochure—Orthman Cultivators and Automatic Guidance Systems (6 pgs) Orthman Manufacturing Inc., Lexington, NE 68850.
Brochure—Orthman, "Phase II Tracker", Automatic Guidance Control System Orthman Manufacturing Inc., Lexington, NE 68850.

Primary Examiner—Richard J. Johnson
Assistant Examiner—Jeffrey L. Thompson
Attorney, Agent, or Firm—Emrich & Dithmar

[57] ABSTRACT

A guidance system for a tractor drawn farm implement for providing an indication to the operator of the tractor as to variance of the implement from a desired course includes a pair of horizontally extending feeler rods supported by a shaft and having free ends extending in a parallel spaced relation to sense the crop and rotate the shaft if the implement veers off course. A light sensitive photopotentiometer coupled to the shaft has its output voltage varied as a function of the angular position of the shaft. A signal processing circuit responds to variation in the voltage of the light sensitive photopotentiometer to drive the needle of an analog meter to indicate the direction and amount of deviation of the implement from the desired course, the meter being mounted on the tractor and within the line of sight of the operator.

6 Claims, 2 Drawing Sheets

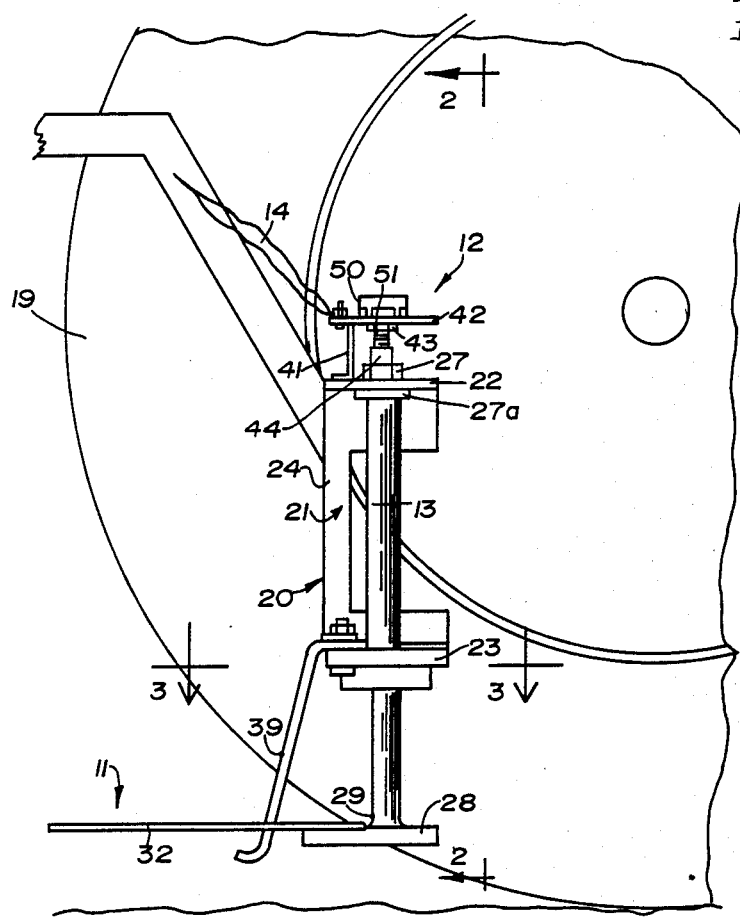
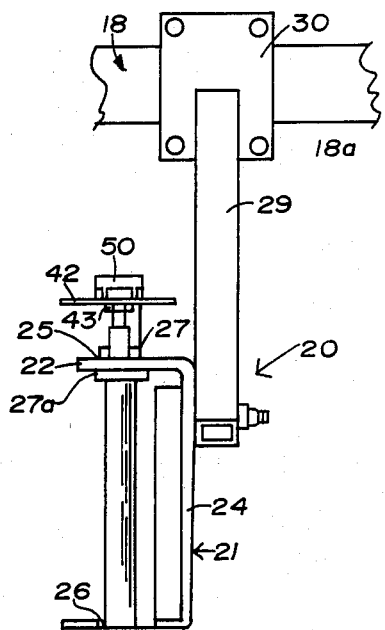
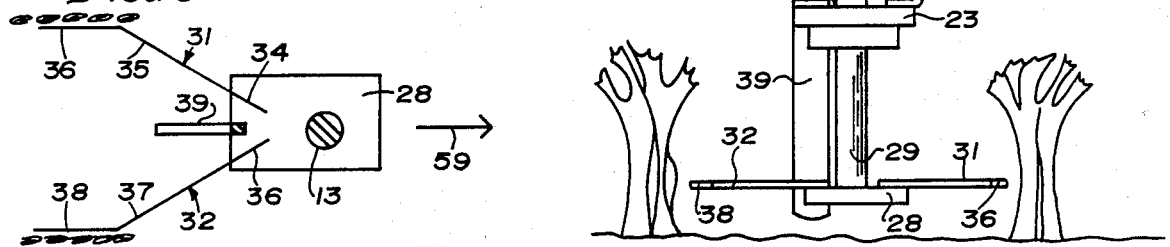
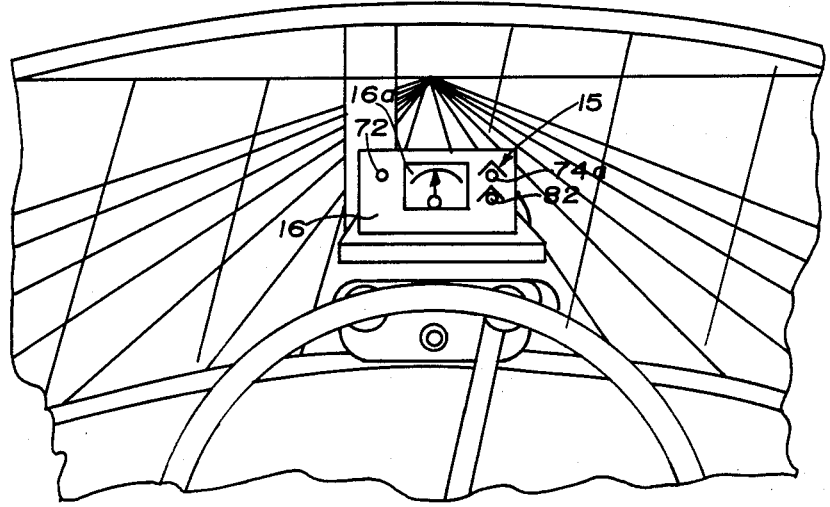

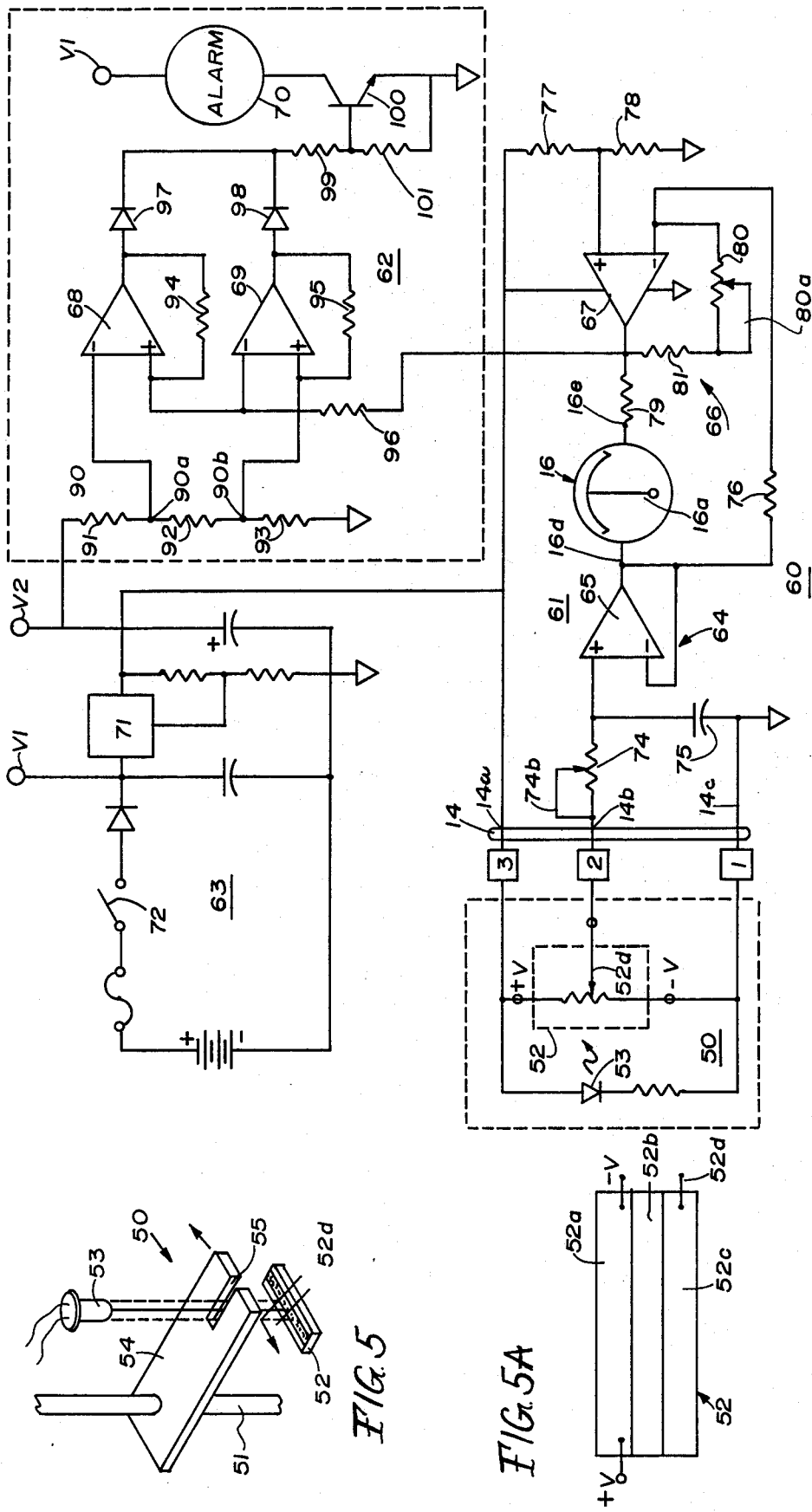

GUIDANCE SYSTEM FOR FARM IMPLEMENTS

This is a continuation of application Ser. No. 892,124, filed July 30, 1986 now abandoned.

BACKGROUND OF THE INVENTION

This invention relates to guidance systems for farm implements and the like, and more particularly to a guidance system which provides an indication of the position of a farm implement relative to the crop rows to assist the driver in maintaining the implement on a desired course while planting, cultivating or harvesting the crop.

One of the most common methods of weed control in agriculture today is mechanical cultivation. To control weeds in row crops, a row cultivator is used. Driving a row cultivator is a very tedious job. Cultivating row crops requires the operator's full concentration to avoid plowing out the crop instead of the weeds. Cultivating for many hours is physically tiring to the eyes as well as the body because the operator must usually assume an unnatural position to see the rows while operating the tractor at the same time. This process has been further complicated in recent years by the adoption of the rear mounted cultivator. Because this type of cultivator is attached to the rear of the farm tractor and is therefore out of the operators normal field of vision, the operator must use some reference other than the actual cultivator to determine his position on the row. The most common reference is a rod suspended from the front axle or side of the tractor and positioned over a row. The operator tries to keep the rod centered over the row with the probability that the rear mounted cultivator will follow.

Many problems arise from using the above technique of guiding a rear-mounted cultivator. This method works well when the rows are straight, but guiding a cultivator in this way is difficult when rows curve. When the rear mounted cultivator is used to cultivate row crops planted on uneven terrain, the rear mounted cultivator tends to drift downhill even though the tractor maintains its position over the row. In cultivator applications, if the cultivator drifts so that one row is off, all of the rows will be off. Unevenness, or changes in soil conditions can cause a rear-mounted cultivator to pull to one side, resulting in plowing out of the crop.

Another consideration is that more and more farmers are using tractors equipped with cabs for reasons of both health and comfort. Most modern tractor cabs restrict the field of vision of the operator even more. As cultivators become larger and wider, accurate control becomes more difficult.

One known guidance control system for a cultivator employs twin probes or discs following a mark or furrow, or guide rods which sense from the crop itself to generate electronic signals indicative of deviation of the cultivator from the desired course. The electronic signals are applied to hydraulically operated steering coulters to maintain the cultivator on course. A display unit in the tractor cab includes a row of light emitting diodes which display the direction from center and magnitude of correction being made by the steering coulters. Only one light emitting diode is lighted at a time. An override control allows the operator to turn the steering coulters either direction from center to compensate for unusual side drifts such as would be encountered while operating on a side hill.

This guidance system provides automatic compensation, steering of the cultivator as a function of the error signal generated by the row position sensor. The visual display indicates to the tractor operator the correction being made by the steering coulters rather than a steering correction to be made by the driver of the tractor. Because the light emitting diodes flash on and off with deviation of the cultivator from the desired course, the display provided is both confusing and distracting to the operator. Moreover, the resolution of the amount of deviation displayed is dependent upon the number of light emitting diodes employed.

SUMMARY OF THE INVENTION

The present invention has provided a guidance system for use with a tractor drawn farm implement for providing an indication to the operator of the tractor as to variance of the implement from a desired course as the implement moves therealong. The guidance system includes position sensing means, error signal producing means, and indicating means. The position sensing means includes a pair of horizontally extending feeler rods supported at one end by a shaft and with free ends extending in a parallel spaced relation in proximity to the crop to sense the crop and cause the shaft to rotate if the implement veers off course. The error signal producing means is coupled to the shaft and actuated thereby to produce an error signal corresponding to the angular position of the shaft in response to deviation of the implement from a desired course. The indicating means is coupled to the error signal producing means and is responsive to the error signal for providing a visual indication of the amplitude and direction of the deviation of the implement from its desired course.

In accordance with one aspect of the invention, the error signal producing means comprises a non-contacting type signal transducing means coupled to the shaft for varying its output as a function of angular rotation of the shaft and thus in correspondence with change in the position of the sensing means. In one embodiment, the signal transducing means comprises a light sensitive photopotentiometer having an output voltage proportional to a moving slit of light directed thereto through a slotted plate. The plate is coupled to the shaft for movement therewith relative to the light source and the light sensitive photopotentiometer to vary the position of the slit of light on the light sensitive photopotentiometer, and thus the output voltage, as a function of the angular position of the shaft. Thus, the light sensitive photopotentiometer provides an output voltage which is correlated with the position of the feeler rods carried by the shaft. The light sensitive photopotentiometer is connected as an input to a signal processing circuit which responds to the variation of the output voltage of the light sensitive photopotentiometer and drives an indicating means, such as an analog meter, to provide a visual indication of the direction and amount of deviation of the implement from the desired course. The meter is located on the tractor and within the line of sight of the operator to be easily viewed by the operator.

DESCRIPTION OF THE DRAWINGS

FIG. 1 is a side view of position sensing apparatus for the implement guidance system provided by the present invention;

FIG. 2 is a front view of the sensing apparatus shown in FIG. 1;

FIG. 3 is a sectional view taken along the line 3—3 of FIG. 1;

FIG. 4 is a fragmentary view illustrating a portion of the interior of a tractor cab showing mounting of the display unit for the guidance system;

FIG. 5 is a simplified representation of an analog signal transducer of the guidance system of the present invention;

FIG. 5A is a plan view of the light sensitive photopotentiometer of the signal transducer shown in FIG. 5; and FIG. 6 is a schematic circuit diagram of the drive circuit for the guidance system.

DESCRIPTION OF A PREFERRED EMBODIMENT

Referring to FIGS. 1 and 4, the guidance system provided by the present invention is described with reference to an application for indicating the position of a tractor drawn farm implement relative to crop rows as the implement is moved along the crop rows. As used herein, the term "drawn implement" includes both implements cantilevered behind the tractor (i.e., mounted to the three-point hitch) as well as implements having their own support wheels and connected to the tractor by a conventional hitch. The indication provided by a display unit 15 including an analog meter 16 mounted on the tractor, preferably within the tractor cab, assists the driver in maintaining the implement on a desired course during planting, cultivating, or harvesting operations. When the implement is on course, the meter needle 16a is at center scale on the meter. If the implement drifts left (or right) relative to the crop rows, the meter needle 16a is driven left (or right) an amount correlated to the amount of the deviation. The meter scale is marked with a color scheme to indicate plant damage correlating to "safe" in green, "caution" in yellow, and "damage" in red.

For the purpose of driving the meter 16, the guidance system includes crop position sensing apparatus 11 and an error signal generating apparatus 12, which is coupled to the position sensing apparatus 11 by a shaft 13 for providing an output indicative of deviation of the implement from the desired course. The output of the error signal generating apparatus 12 is connected by electrical leads 14 to the display unit 15 (FIG. 4) which is mounted within the cab of the tractor and in the line of sight of the operator. The display unit 15 houses electronic circuits which process the error signal generated by the error signal generating apparatus 12 and provide signals for driving the meter 16 to provide a visual indication of the amplitude and polarity of the error signal, and thus the amount and direction of deviation of the implement from the desired course.

More specifically, with reference to FIGS. 1 and 2, the position sensing apparatus 12 is mounted to the frame 18 of the implement to be guided which, for example, may be a rear mounted cultivator. A support assembly 20 mounts the shaft 13 forwardly of the front surface 18a of the frame 18 of the cultivator adjacent to the rear wheel 19 of the tractor. The support assembly 20, which rotatably mounts shaft 13 in a vertical orientation, includes a generally C-shaped bracket 21 defining horizontally extending top and bottom support plates 22 and 23 interconnected by a vertically extending side plate 24. Referring to FIG. 2, the mounting bracket 21 is attached to the frame 18 of the cultivator by a shaft 29 and a mounting plate 30.

The support plates 22 and 23 include central apertures 25 and 26, respectively. The shaft 13 is supported vertically at its upper end by a collar 27 and bearing 27a mounted in aperture 25. Aperture 26 defines a bearing surface for the lower end of the shaft 13 which passes through the aperture. A horizontally extending base plate 28 is attached to the bottom end 29 of shaft 13 as by welding. The base plate 28 mounts the position sensing apparatus 11.

Referring to FIG. 3, the position sensing apparatus 11 comprises a pair of stainless steel feeler rods 31 and 32, each approximately five feet in length. The rods 31 and 32 are tapered to eliminate mass at the plant contact area to both protect sensitive young plants from damage and to provide better mechanical operation. The feeler rods 31 and 32 are rigidly secured to the shaft 13 by base plate 28 and movable in a horizontal plane in rotating of the shaft 13 about its axis. Rod 31 is secured, as by welding, to the base plate 28 at one end 34 and has portion 35 which extends outwardly and rearwardly from the base plate 28 at an angle relative to the direction of travel and free end portion 36 which is bent inwardly to extend generally perpendicular to the direction of travel of the implement represented by the arrows 59 in FIG. 3.

Similarly, rod 32 is connected to the base plate 28 at one end 36 and has portion 37 which extends outwardly from and rearwardly from the base plate 28 at an angle relative to the direction of travel of the implement with a free end portion 38 bent inwardly to extend generally perpendicular to the direction of travel of the implement and parallel to rearward portion 36 of feeler rod 31. The spacing between the parallel extending portions 36 and 38 of the feeler rods 31 and 32 is selected to correspond to the row spacing between crops, as shown in FIG. 3, so that the rods 31, 32 will cause the shaft 13 to rotate clockwise or counterclockwise in the event the cultivator is driven off course toward the right or left, respectively, as viewed in FIG. 2. A travel limit member 39 which extends vertically downward from the back edge of support plate 23 has its upper end attached to the plate 23 and its lower end extending between the two rods, limiting rotation of the rods.

Referring to FIGS. 1 and 2, the signal generating apparatus 12 comprises a non-contacting type analog signal transducer 50 which in a preferred embodiment comprises a light sensitive photopotentiometer 52 (FIG. 5). The signal generating apparatus 12 is mounted in overlying relation with the top plate 22 by a bracket 41 and mounting plate 42. The mounting bracket supports the mounting plate 42 horizontally in a spaced relation relative to the upper surface of support plate 22. Mounting plate 42 has a central aperture 43 through which projects the drive member 51 of the analog signal 50 which is connected to the upper end of the shaft 13 by a suitable coupling member 44.

Referring to FIGS. 5 and 5A, the signal transducer 50 comprises the light sensitive photopotentiometer 52, a light source 53, such as a light emitting diode, and a movable plate 54 having a slit 55 at one end thereof. The assembly is completely enclosed within a light tight housing (not shown). The slotted plate 54 is interposed between the light sensitive photopotentiometer 52 and the light source 53. The slotted plate is carried on the drive member or shaft 51.

Referring to FIG. 5A, the light sensitive photopotentiometer 52 is comprised of three basic elements, a non light sensitive metal thin film resistor 52a, a photoresistor 52b, and an electrode 52c which are attached to a common ceramic substrate or base. The light sensitive photopotentiometer is used in a variable voltage divider configuration, providing an output voltage proportional to the tap on the main metal resistor element 52a. Respective terminals +V and −V of metal resistor 52a are connected to a regulated supply voltage V2 and ground providing voltage potential within the range of the supply voltage V2 from which an output voltage can be tapped. The electrode 52c, which serves as the output connection, is photo electrically tapped to the infinite voltage potential of the metal resistor 52a through light sensitive resistor 52b. The tap point 52d between the metal resistor 52a and output electrode 52c is determined by the position of a "slit of light" from light source 53 impinging upon the surface of the light sensitive resistor 52b. Only the portion of light sensitive resistor 52b receiving light provides a low resistance useable connection or "tap" from the metal resistor 52a to the output electrode 52c. Dark areas, those areas not receiving the slit of light, are very high in resistance and thus do not provide this necessary coupling.

The drive member or shaft 51 extends through the light tight housing and is coupled to the shaft 13 for rotation thereby relative to the light sensitive photopotentiometer 52 in accordance with the angular rotation of the shaft 13 and thus of the feeler rods 31, 32 relative to the crop rows. The output voltage of the light sensitive photopotentiometer 52 thus varies in correspondence with the position of the feeler rods 31, 32.

Referring to FIG. 6, the light sensitive photopotentiometer 52 is connected as an input to a signal processing circuit 60 which responds to the error signal generated by the error signal generating apparatus 12, i.e. variation in the voltage output of the light sensitive photopotentiometer, and produces a drive signal for the meter 16 for positioning its needle 16a to indicate the error. The circuit 60 includes a meter drive circuit 61, an over travel alarm circuit 62 and a voltage regulator circuit 63.

The meter drive circuit 61 includes a meter response (or speed) control circuit 64 including an operational amplifier 65, and a range sensitivity adjust circuit 66 including an operational amplifier 67.

The over travel alarm circuit 62 comprises a pair of operational amplifiers 68 and 69 connected for operation as a window comparator circuit to operate an audible alarm device 70 whenever the error signal indicates an extreme deviation of the cultivator relative to its desired course.

The power supply circuit 63 provides an unregulated voltage V1 derived from the vehicle battery for energizing the alarm device 70. The power supply circuit includes a voltage regulator circuit 71 which provides a regulated voltage V2 for the meter response control circuit 61, alarm circuit 62, and the light sensitive photopotentiometer 52. An on/off switch 72, which is mounted on the front panel of the display unit 15 enables the signal processing circuit 60 to be deenergized when not in use.

More specifically, the light sensitive photopotentiometer 52 is connected via three conductor cable 14, including conductors 14a, 14b and 14c, to inputs of the meter drive circuit 61. Conductor 14a connects voltage V2 to the V+ lead of light sensitive photopotentiometer 52 and the anode of the light emitting diode 53 and conductor 14c connects ground or reference potential to V− lead of light sensitive photopotentiometer 52 and the cathode of the light emitting diode 53 through a current limiting resistor 56. The third conductor 14b connects output tap 52d of the light sensitive photopotentiometer 52 to the input of the meter drive circuit 61.

Referring to the meter drive circuit 61, the meter response circuit 64 includes a variable resistor 74 and a capacitor 75. Resistor 74 has one terminal connected to conductor 14b and its other terminal connected to the non-inverting input of operational amplifier 65 and through capacitor 75 to ground. Variable resistor 74 and capacitor 75 form a variable low-pass filter circuit which enables adjustment of the response time of the meter drive circuit 61 to changes in the error signal. A control knob 74a mounted on the panel of display unit 15 (FIG. 4) and coupled to wiper 74b of the resistor 74 enables adjustment of the value of resistor 74. Amplifier 65, which is connected for operation as a voltage follower, has its output connected to one terminal 16d of the meter and back to its inverting input. The output of amplifier 65 is also connected through a resistor 76 to the inverting input of operational amplifier 67 of range sensitivity adjust circuit 66.

Amplifier 67 has its non-inverting input connected to the junction of voltage dividing resistors 77 and 78 which are connected between voltage V2 and ground to provide a reference voltage level at the non-inverting input of the amplifier 67. The reference voltage produced at the junction of resistors 77 and 78 is equal to the null point (or no error) output voltage of the light sensitive photopotentiometer (i.e. one half of V2). The output of the amplifier 67 is connected to another terminal 16e of the meter through a resistor 79 and through feedback resistors 80 and 81 to the non-inverting input of the amplifier 67. Resistor 80 is a variable resistor which enables adjustment of the range sensitivity for the meter drive circuit 61. A control knob 82 coupled to wiper 80a of resistor 80 and mounted on the display unit 15 (FIG. 4) enables adjustment of the value of resistor 80.

The meter drive circuit 61, and in particular the voltage follower amplifier 65, interfaces the output of the light sensitive photopotentiometer, a relatively high impedance, with the lower impedance of the drive winding (not shown) for the meter 16.

The gain of amplifier 67 is adjustable over a range of 8:1 by variable resistor 80 which provides a range sensitivity adjustment. This adjustment enables the colored error or deviation bands provided on the meter face to represent as little as a two to three inch cultivator position error or as much as a sixteen to twenty-four inch position error. This adjustment allows compensation for a wide variety of row crop applications.

Referring to the over travel alarm circuit 62, amplifiers 68 and 69, which are connected for operation as a window comparator circuit, have upper and lower limit values set by voltage divider network 90. Amplifier 68 has its inverting input connected at point 90a to the junction of the voltage divider resistors 91, 92 and 93 which are connected in series between voltage V2 and ground. The junction of resistors 92 and 93 at point 90b is connected to the non-inverting input of amplifier 69. Amplifiers 68 and 69 have respective feedback resistors 94 and 95 connected between their output and non-inverting input to provide hysteresis for better circuit stability. The non-inverting input of amplifier 68 and the inverting input of amplifier 69 are connected together and through a resistor 96 to the output of amplifier 67 to receive the error signal provided thereat. The outputs of the amplifiers 68 and 69 are logically "OR'd" through diodes 97 and 98, respectively and through a common resistor 99 to the base of a drive transistor 100. The base of transistor 100 is also connected through a resistor 101 to ground. The emitter of transistor 100 is connected directly to ground. The alarm device 70 is connected in the collector circuit of the transistor 100.

Resistors 91-93 of the voltage divider network 90 establish upper and lower limits for the error signal extended to the respective amplifiers 68 and 69 from the output of amplifier 67. Because the outputs of the two amplifiers 68 and 69 are "OR'd" by diodes 97 and 98, whenever the amplitude of the error signal is of a value outside of the range defined by resistors 91-93, the transistor 100 is enabled by comparator 68 or 69 activating the alarm device 70.

In operation of the guidance system, with reference to FIGS. 2, 3, and 4, the feeler rods 31 and 32 extend horizontally backward with respective parallel extending portions 36 and 38 extending parallel to the direction of travel, indicated by the arrow 59, of the cultivator when it is on course. When the cultivator is on course, the meter needle 16a is at midscale. If the cultivator veers to the left, for example, the free end 36 of feeler rod 31 will engage the crop along the left hand side of the cultivator, pivoting the shaft 13 from its neutral position counterclockwise as viewed in FIG. 3 an angular distance corresponding to the deviation from the course, producing a corresponding change in the output voltage of the light sensitive photopotentiometer 52.

Referring to FIG. 6, assuming that counterclockwise rotation of the shaft 13 results in a decrease in the voltage output of the light sensitive photopotentiometer 52 from its null value the signal output of amplifier 65 will decrease and the signal output of amplifier 67 will increase causing the needle 16a to be driven towards the left an amount proportional to the distance the cultivator has veered off course.

If, for any reason, there is an extreme deviation of the cultivator from its desired course, the signal output of amplifier 67 will exceed the reference level provided at the inverting input of amplifier 68 of the over travel alarm circuit 62. Accordingly, transistor 100 will be rendered conductive, energizing the audible alarm device 70 for alerting the driver of the tractor to the condition.

Because the meter 16 is mounted in the tractor cab in the line of sight of the operator, the operator is alerted immediately as to the deviation of the cultivator from the desired course, enabling the operator to steer the tractor to correct for the deviation. In response to the correction, the feeler rod 32 will engage the crop on the right hand side of the cultivator, pivoting the shaft 13 clockwise back to its neutral position, increasing the output voltage of the light sensitive photopotentiometer 52 to its null value with an attendent change in the signal outputs of amplifiers 65 and 67 to drive the meter needle 16a back to the midscale position. A similar operation will ensue if the cultivator drifts to the right. However, for such condition, the output voltage of the light sensitive photopotentiometer will increase, and the outputs of amplifiers 65 and 67 will increase and decrease, respectively. Also, an over travel alarm will be generated in response to the error signal at the output of amplifier 69 exceeding the lower limit value reference supplied to the non-inverting input of amplifier 69.

Having thus disclosed in detail preferred embodiments of the invention, persons skilled in the art will be able to modify certain of the structures which have been described and to substitute equivalent elements for those disclosed while continuing to practice the principle of the invention; and it is, therefore, intended that all such modification and substitutions be covered as they are embraced within the spirit and scope of the appended claims.

We claim:

1. In combination with a tractor and a drawn implement mounted to said tractor and located behind said tractor; the improvement comprising a guidance system for providing an indication to the operator of the tractor of variance of the implement from a desired course relative to crop rows as the implement is drawn therealong, said guidance system comprising: position sensing means including crop-engaging rod means having first and second portions extending in spaced relation for engaging the crop when said implement deviates from a desired course; support means including rotatable means mounting said sensing rod means to said implement, said sensing rod means causing said rotatable means to rotate about a vertical axis whenever the implement deviates from the desired course and said sensing rod means engages a row of crop; error signal generating means coupled to said rotatable means for generating an error signal indicative of the amount and direction of rotation of said rotatable means; and indicating means including an analog meter and drive circuit means for said meter responsive to said error signal generating means, said meter being mounted on the tractor in the normal line of sight of the operator in the forward direction, said drive circuit means being responsive to said error signal for driving an indicating needle of said meter from a midscale position by an amount and in a direction corresponding to the error signal.

2. A guidance system according to claim 1, wherein said drive circuit means includes response time adjust means for varying the response time of said drive circuit to changes in the error signal.

3. A guidance system according to claim 1, wherein said drive circuit means comprises range sensitivity adjust means manually adjustable for varying the response of the drive circuit means to a given variation in the error signal to produce a corresponding variation in the deflection of the meter indicating needle.

4. A guidance system according to claim 1, wherein said drive circuit means includes over limit travel circuit means responsive to said error signal; and alarm indicating means actuated by said over limit travel circuit means when said error signal exceeds a predetermined value.

5. A guidance system according to claim 4, wherein said over limit travel circuit means comprises a window comparator circuit including first and second comparator circuits, reference means for providing first and second reference signals for said first and second comparator circuits, respectively, and circuit means coupling said error signal to said comparator circuits.

6. A guidance system according to claim 1, wherein said error signal generating means comprises analog signal transducer means including a light responsive variable voltage divider means coupled to said rotatable means for actuation thereby to provide an output voltage which varies in correspondence with the angular position of said rotatable means.

* * * * *